Patented May 11, 1926.

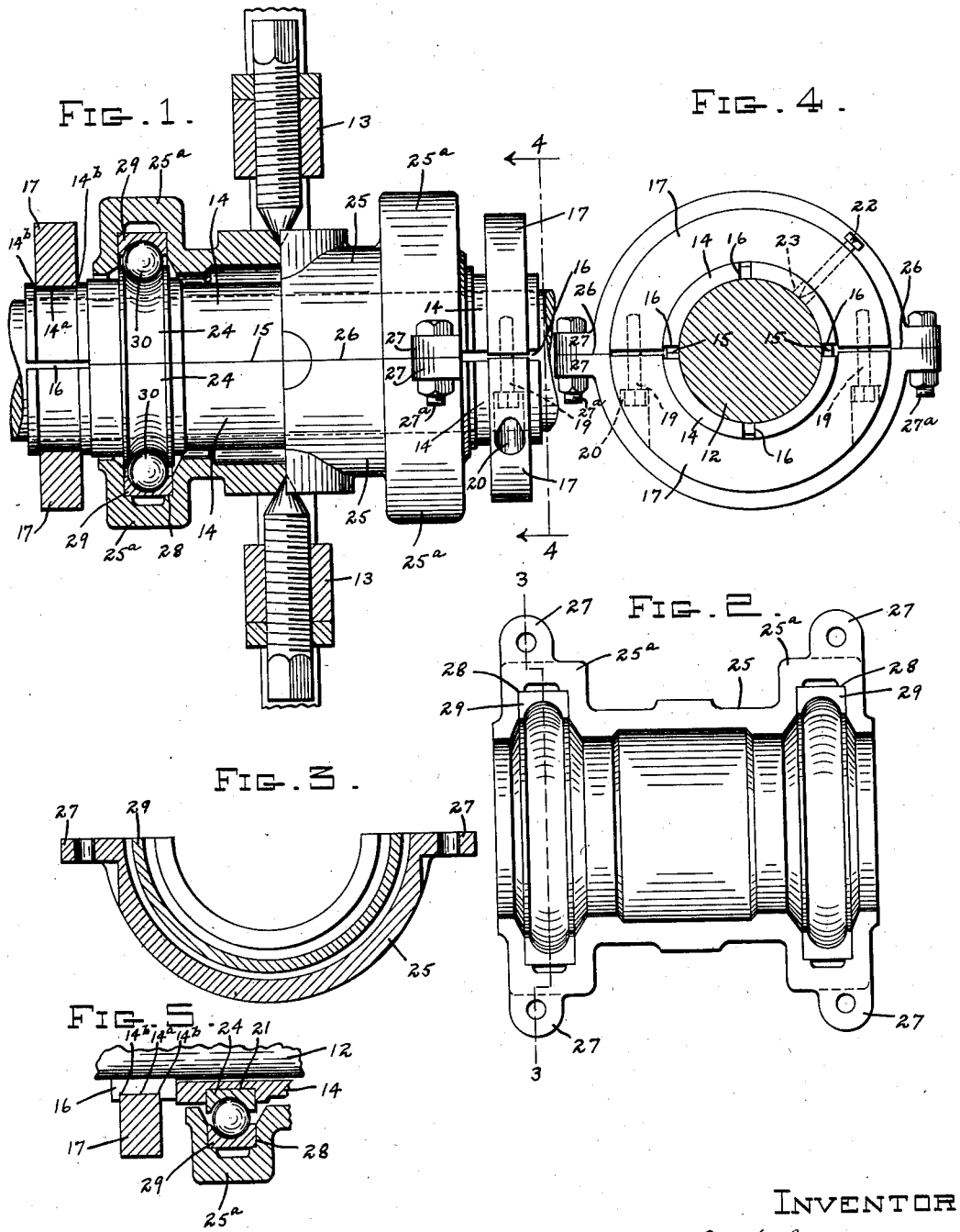

1,583,914

UNITED STATES PATENT OFFICE.

CHARLES K. BUSWELL, OF NORTH ABINGTON, MASSACHUSETTS, ASSIGNOR TO ANTI-FRICTION SHAFTING BEARING COMPANY, OF PORTLAND, MAINE, A CORPORATION OF MAINE.

BALL BEARING.

Application filed November 21, 1921. Serial No. 516,556.

This invention relates to ball bearings for shafting, of the type shown by the Chapman Patent, No. 1,213,805, dated January 23, 1917, said patented bearing comprising a divided sleeve having end portions adapted to be clamped upon a shaft, and circumferential ball races adjacent to said end portions, divided locking rings to removably clamp the end portions of the sleeve on the shaft, and a divided housing having interior ball races in alinement with the ball races of the sleeve, and applied to the sleeve, and bearing balls arranged in the alined ball races of the sleeve and housing.

The objects of the present invention are, to provide certain improvements relating to the locking rings, the sleeve and its ball races, and the means for engaging the locking rings with the divided sleeve, and certain improvements relating to the divided housing and its ball races.

The invention is embodied in the improvements hereinafter described and claimed.

Of the accompanying drawings forming a part of this specification,—

Figure 1 shows portions of a bearing embodying my improvements, in side elevation, and other portions in section, and a hanger shown in section.

Figure 2 is a plan view of one of the divisions of the housing.

Figure 3 is a section on line 3—3 of Figure 2.

Figure 4 is a section on line 4—4 of Figure 1, and an elevation of parts at the left of said line.

Figure 5 is a sectional view, similar to a portion of Figure 1, showing also a portion of the sleeve and one of its ball races in section.

The same reference characters indicate the same parts in all of the figures.

In the drawings, 12 represents a portion of a shaft, and 13, 13 represent portions of a hanger which supports the bearing hereinafter described, the shaft passing through the bearing which, as in the Chapman patent, includes a divided sleeve, whose sections are clamped upon the shaft and provided with circumferential ball races, and a divided housing whose sections are applied to the sleeve, and having interior ball races in alinement with the ball races of the sleeve, bearing balls being confined between the races of the sleeve and housing. The sleeve is freely rotatable with the shaft in the housing, and the housing is engaged by any suitable means with the hanger.

As in the Chapman patent, the divisions or sections of the sleeve are clamped on the shaft by divided locking rings, adapted to hold said sections together, and the locking rings are adapted to be opened and removed from the sleeve to permit the removal of the sleeve and its ball races from the shaft.

I will first describe my improvements relating to the sectional sleeve and the sectional locking rings.

The sections 14, 14 of said sleeve have abutting edges meeting at 15 (Figures 1 and 4), and are provided with longitudinal slots 16 in their end portions, of sufficient width to render said portions compressible on the shaft. The slotted end portions are provided with peripheral end grooves 14$^a$, one of which is shown by Figures 1 and 5, said grooves intersecting the slots 16 and forming spaced apart circumferential shoulders 14$^b$. The sections 17, 17 of each of the divided locking rings are slightly spaced apart at their ends to form some of the slots 16, as shown by Figure 4, and are connected by clamping screws 19, having heads seated on the bottoms of recesses 20 in one section, and engaging tapped orifices in the other section, as shown by Figures 1 and 4, the arrangement being such that rotation of the screws in one direction draws the sections 17 inwardly, and causes the compression of the slotted end portions of the sleeve. The sides of the locking rings bear on the circumferential shoulders 14$^b$, as shown at the left of Figure 1, and by Figure 5, so that the rings prevent independent endwise movement of the sleeve sections.

If desired, one of the sections 17 of each locking ring may be provided with a set screw 22, projecting through an orifice 23 in one of the sleeve sections 14, and engaging the shaft to prevent the possibility of a turning movement of the sleeve and locking rings on the shaft.

The sleeve sections 14 are provided with intermediate peripheral grooves 21, having opposed parallel sides. One of said grooves is shown in cross section by Figure 5. In said intermediate grooves are snugly fitted and rigidly secured external or circumfertial sectional ball races, in alinement with the sectional ball races hereinafter described, of the housing, each external ball race being composed of two externally grooved sections 24, of suitably hard metal, such as hardened steel, having parallel sides adapted to be firmly engaged with the parallel sides of the grooves 21, by the operation of pressing the ball race sections 24 into the grooves 21.

I have improved the divided housing as next described. The sections 25, 25, of the housing have abutting edges meeting at 26 (Figures 1 and 2), as in the Chapman patent, said sections having ears 27, connected by bolts 27ª. In the end portions of the housing sections are internal grooves 28, having opposed parallel sides, and preferably formed in enlargements 25ª of said sections. In said internal grooves are snugly fitted and rigidly secured internal divided ball races, in alinement with the races of the sleeve, each internal ball race being composed of two internally grooved sections 29, of suitably hard metal, such as hardened steel, having parallel sides adapted to be firmly engaged with the parallel sides of the grooves 28, by the operation of pressing the ball race sections 29 into the grooves 28.

The hard metal ball races 24 and 29 contribute materially to the longevity of the bearing, and are more durable and reliable than the chilled ball races shown by the Chapman patent. The parallel sides of the grooves 21 and 28, and the parallel sides of the ball race sections, enable each sleeve section and housing section to be provided with a hardened steel ball race section, which is so firmly secured, that the sleeve sections, the housing sections, and the ball race sections engaged therewith, constitute units adapted to be handled as such without liability of the separation of the ball race sections from the grooved sections.

The ball races may be formed to receive and confine any desired arrangement of bearing balls 30.

The operation of applying the bearing to the shaft may be as described in the said Chapman patent.

I claim:

1. A ball-bearing for shafting comprising a sectional sleeve, having in its sections parallel sided external grooves, a sectional housing, having in its sections parallel sided internal grooves, hardened external ball race sections, having parallel sides pressed into the grooves of the sleeve sections, hardened internal ball race sections having parallel sides pressed into the grooves of the housing sections, and means for confining, upon a shaft, the sleeve sections, the housing sections, and balls engaged with the ball race sections.

2. A ball-bearing for shafting comprising a sectional sleeve provided with longitudinal slots in the end portions of its sections, whereby said portions are adapted to be compressed upon a shaft, peripheral end grooves intersecting said slots, and peripheral intermediate grooves having parallel sides, divided hardened external ball race sections, having parallel sides and pressed into said intermediate grooves; sectional locking rings fitted in said end grooves, the sections of said rings being connected by clamping screws, whereby the rings are clamped upon the slotted ends of the sectional sleeve; a sectional housing having parallel sided internal grooves in the end portions of its sections, and hardened internal ball race sections, having parallel sides fitted in said internal grooves, said housing being applied to the sleeve in position to cause alinement of its ball race sections with the ball race sections of the sleeve; and the confinement of bearing balls by the races formed by said sections.

3. A ball-bearing for shafting substantially as specified by claim 2, comprising also set screws engaged with tapped orifices in said rings, the slotted portions of said sleeve being provided, between adjacent slots, with orifices arranged to permit the set screws to engage the sleeve and positively connect the rings with the sleeve.

In testimony whereof I have affixed my signature.

CHARLES K. BUSWELL.